US008755323B2

(12) United States Patent
Wang et al.

(10) Patent No.: US 8,755,323 B2
(45) Date of Patent: Jun. 17, 2014

(54) METHOD AND APPARATUS FOR TRANSMITTING MCCH CONTROL SIGNALING IN MBSFN MANNER

(75) Inventors: He Wang, Shanghai (CN); Yu Chen, Shanghai (CN); Yonggang Wang, Shanghai (CN)

(73) Assignee: Alcatel Lucent, Paris (FR)

( * ) Notice: Subject to any disclaimer, the term of this patent is extended or adjusted under 35 U.S.C. 154(b) by 42 days.

(21) Appl. No.: 13/266,318

(22) PCT Filed: Apr. 28, 2009

(86) PCT No.: PCT/CN2009/000460
§ 371 (c)(1),
(2), (4) Date: Oct. 26, 2011

(87) PCT Pub. No.: WO2010/124416
PCT Pub. Date: Nov. 4, 2010

(65) Prior Publication Data
US 2012/0044826 A1 Feb. 23, 2012

(51) Int. Cl.
*H04H 20/71* (2008.01)
(52) U.S. Cl.
USPC .......................................................... 370/312
(58) Field of Classification Search
USPC .................. 370/310, 310.2, 312, 328, 329
See application file for complete search history.

(56) References Cited

U.S. PATENT DOCUMENTS

| 2009/0147717 A1* | 6/2009 | Cai ................................ 370/312 |
| 2009/0232095 A1* | 9/2009 | Ahn et al. ..................... 370/331 |
| 2009/0296645 A1* | 12/2009 | Bui ................................ 370/329 |
| 2010/0189026 A1* | 7/2010 | Lee et al. ...................... 370/312 |

FOREIGN PATENT DOCUMENTS

| CN | 101272518 A | 9/2008 |
| CN | 101286826 A | 10/2008 |
| CN | 101312556 A | 11/2008 |
| EP | 2134103 A1 | 12/2009 |

OTHER PUBLICATIONS

International Search Report for PCT/CN2009/000460 dated Feb. 4, 2010.

* cited by examiner

*Primary Examiner* — Anh Ngoc Nguyen
(74) *Attorney, Agent, or Firm* — Fay Sharpe LLP (57) ABSTRACT

A method and device for realizing MBMS control signaling transmission in MBSFN manner are provided in the present invention. Wherein, a base station transmits multimedia broadcast multicast service MBMS control signaling in MBSFN manner, preferably, the base station multiplexes MBMS control signaling and MBMS service data in a same MBSFN subframe, and transmits them according to an adjustment period and/or a repetition period. Then, a mobile station receives the MBMS control signaling at the corresponding MBSFN subframe according to the adjustment period and/or the repetition period. With the solution of the present invention, MBMS control signaling transmission in MBSFN manner is realized.

12 Claims, 7 Drawing Sheets

METHOD AND APPARATUS FOR TRANSMITTING MCCH CONTROL SIGNALING IN MBSFN MANNER

FIELD OF THE INVENTION

The present invention relates to telecommunication network, more particularly, to method and apparatus for transmitting signaling in wireless telecommunication network.

BACKGROUND OF THE INVENTION

MBMS, an important feature introduced in R6 (Release 6) by 3GPP ($3^{rd}$ Generation Partnership Project) organization, is a point-to-multipoint service which can transmit data from a source to several users in some specified range simultaneously, and further share the resources of network including core network and access network, to render services, e.g. multi-media services, to a large number of users who have the same needs with less resources.

After a long period of research and development, MBMS already achieved full implementation in R6, R7 of 3G system, but it cannot meet the growing demand of services, especially the strong demand on mobile TV services of users and services providers. For improving QoS of MBMS further, and adapting to the new LTE (Long Term Evolution) system, MBMS makes significant improvements on logical architecture, service mode, transmitting method, and channel structure, etc. Therefore, the evolution of R6/R7 MBMS to SAE-MBMS (System Architecture Evolve-Multimedia Broadcast Multicast Service) and LTE-MBMS (Long Term Evolution-MB MS) is experienced.

In eMBMS (Evolved-Multimedia Broadcast Multicast Service), SFN (Single Frequency Network) transmission manner is introduced into access network, which is called MBSFN (Multicast Broadcast Single Frequency Network) transmission manner, wherein, several base stations simultaneously transmit the same data with the same resources and the same wireless configuration (e.g. modulation and coding scheme). These multiple cells for MBSFN transmitting are called MBSFN Area. Using MBSFN transmitting manner can reduce frequency resources, and improve frequency spectrum utilization rate. Meanwhile, diversity effect of transmitting with several cells with same frequency can resolve the problems of the coverage of blind area, enhance the reliability of receiving, and increase the coverage.

In the current R6 MBMS, MBMS control signaling, known as the control signaling transmitting on the MBMS MCCH (Multicast Control Channel), which uses the common signaling transmitting manner, is sent according to the Service ID on the reserved signaling channel, therefore it cannot support MBSFN transmitting.

SUMMARY OF THE INVENTION

The present invention proposes some implementations for transmitting MBMS control signaling in MBSFN manner, especially the implementation of transmitting MCCH signaling in MBSFN manner in Layer 2 (L2).

According to a first aspect of the present invention, there is provided a method, in a base station in wireless telecommunication network, of controlling the transmitting of MBMS control signaling, wherein the method comprises: transmitting MBMS control signaling in MBSFN manner;

According to a second aspect of the present invention, there is provided a method, in a mobile station in wireless telecommunication network, of receiving MBMS control signaling, wherein the mobile station receives the system message, which includes the modification period and/or repetition period related information. wherein the method comprises: according to the modification period and/or repetition period, receiving the MBMS control signaling in the MBSFN subframe;

According to a third aspect of the present invention, there is provided a controlling apparatus, in a base station in wireless telecommunication network, for controlling the transmitting of MBMS control signaling, comprising: sending apparatus, for sending the MBMS control signaling in MBSFN manner;

According to a fourth aspect of the present invention, there is provided a receiving apparatus, in a base station in wireless telecommunication network, for receiving MBMS control signaling, wherein the mobile station receives the system message from the base station, comprising: receiving apparatus, for receiving the MBMS control signaling in the MBSFN subframe according to the modification period and/or repetition period.

With the solution provided by the present invention, transmitting the MBMS control signaling in MBSFN manner is realized, preferably, multiplex MTCH control signaling and MCCH control signaling in one MBSFN subframe, and allocate resources for MCCH control signaling in MBSFN subframe dynamically.

BRIEF DESCRIPTION OF DRAWINGS

With reference to the following detailed description of the non-restrictive embodiments, other features, objects and advantages of the present invention will be more apparent.

Wherein same or similar reference numerals refer to same or similar apparatuses (modules) or steps.

DETAILED DESCRIPTION OF EMBODIMENTS

MBMS service data, e.g. service data transmitted on MTCH (Multicast Traffic Channel), is transmitted in MBSFN manner, while MTCH is mapped to MCH (Multicast Channel), and MCH is mapped to PMCH (Physical Multicast Channel).

MTCH service data is transmitted in MBSFN manner, which means RS (Reference Signal) and scrambling code are the same in MBSFN area for PMCH. Signals transmitted in MBSFN manner from different base stations add naturally in the air. UE (User Equipment) uses the same RS to the perform combined MBSFN channel estimation, because RS and scrambling code are the same in the whole MBSFN area. UE does not need to distinguish which base station the combined signal is transmitted from, and demodulate and decode the combined signal directly.

When MCCH and MTCH are all mapped to MCH (Multicast Channel), that means MCCH and MTCH can only be carried in MBSFN subframe. If there are both MCCH transmitting and MTCH transmitting in a MBSFN subframe, when MTCH is transmitted in MBSFN manner, that means MCCH has to be transmitted in MBSFN manner. Otherwise, if MCCH is transmitted in non-MBSFN manner, and it will influence the MTCH service data transmission in the same MBSFN subframe transmitted in MBSFN manner, e.g. MTCH service data in the same MBSFN subframe as MCCH control signaling cannot be allocated the same resources in a different eNBs. Furthermore, as already discussed in the above, UE estimates the received signaling with combined MBSFN manner; therefore if different eNBs are transmitting in non-MBSFN manner on MCH, UE cannot demodulate and decode the received data correctly.

The following will describe the MCCH control signaling transmitting in MBSFN manner in embodiments.

The First Embodiment

Figure 1:
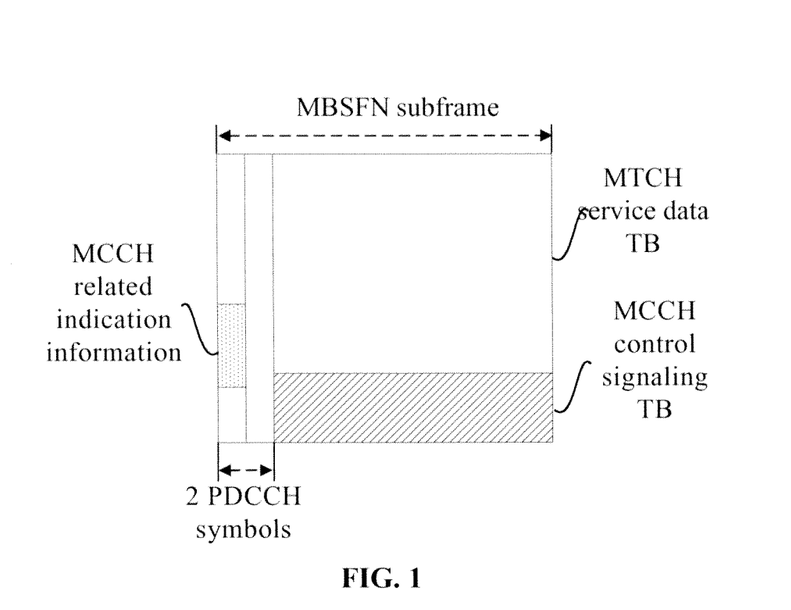
FIG. 1 shows a schematic diagram of the MBSFN subframe for transmitting MCCH control signaling according to the first embodiment of the present invention.

FIG. 1 shows a schematic diagram of transmitting MCCH control signaling of a embodiment;

A MBSFN subframe is 1 ms, or a TTI (Transmission Time Interval). A subframe includes 12 symbols, e.g. 12 OFDM symbols.

In which, the first two symbols in a MBSFN subframe are reserved to PHICH (Physical HARQ Indication Channel), CRS (Common Reference Signal) and etc., instead of MBSFN transmission, for unicast user to handover between cells, load balance or interference coordination measurement, therefore the first two symbols in MBSFN subframe can be considered as PDCCH (Physical Downlink Control Channel) symbols.

Figure 2:
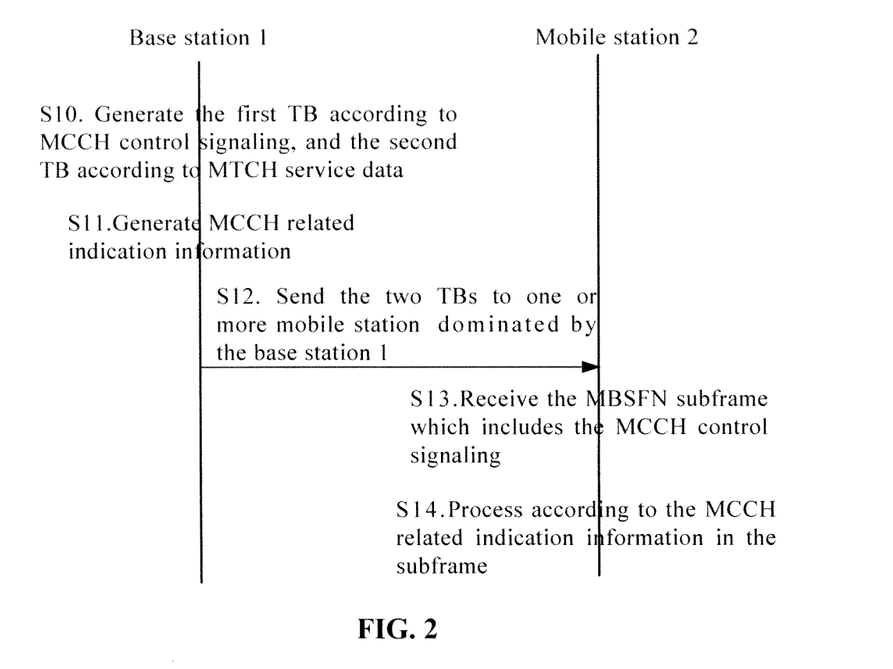
FIG. 2 shows a method flowchart according to the first embodiment of the present invention.

Now combining FIG. 2 and referring to FIG. 1, the method flowchart of first embodiment of the present invention is described as follows. As shown in FIG. 2, in step S10, base station 1 generates the first TB (Transmission Block) according to MCCH control signaling, which is MCCH control signaling TB; and the second TB according to MTCH service data, which is MTCH service data TB. Therefore, as shown in FIG. 1, MCCH control signaling and MTCH service data are multiplexed in the same subframe in the form of two TBs. Those skilled in the art can understand the first TB and the second TB show in FIG. 1 as squares are for illustration only, the first TB may be mapped to one or more RBs (Resource Block) which may be discrete, the second TB may be mapped to one or more RBs which may be discrete. In fact, the pattern that RBs mapped on the MBSFN subframe may be irregular.

Afterwards in step S11, base station 1 generates MCCH related indication information in the subframe. The MCCH related indication information comprises, e.g. DCI (Downlink Control Indication) and MBMS-RNTI (MBMS-Radio Network Temporary Identifier). The DCI and MBMS-RNTI information can be located in PDCCH symbols.

Wherein defining DCI format 4, DCI format 4 includes:
Information about the RBs occupied by MCCH, or the location of MCCH signaling;
MCS (Modulation and Coding Schema) of MCCH.
In another embodiment, DCI format 4 may include new service notification indicator.

New defined DCI format 4 considers the necessary indication information to the dynamic schedule MCCH control signaling; therefore it omits some parameter defined in other DCI format. Of course, DCI format 1, 2 and etc. which are already defined, can be reused as well.

It should be noted that, base station 1 may determine the RBs occupied by MCCH precisely according to the actual amount of MCCH data, to dynamically schedule MCCH TB; and base station 1 may determine the MCS of MCCH MCCFT dynamically according to the QoS etc. information required by MCCH.

MCCH related indication information includes MBMS-RNTI. For more reliable transmission, CRC (Cyclic Redundancy Check) may be used for DCI. When base station 1 calculates CRC for DCI, RNTI is added to CRC as a mask. RNTI comprises paging-RNTI, MBMS-RNTI, S-RNTI, User specific RNTI and etc. Each RNTI has a fixed value defined in related protocols, which is not to be repeated here. Base station 1 knows which data needs to be scheduled by it, therefore it will add corresponding RNTI in CRC according to the data actually to be scheduled.

Afterwards, in step S12, base station 1 transmits the two TBs to physical layer via MCH, and sends to one or more mobile station dominated by the base station 1.

Considering the reliability of transmission, power saving mode of UE, and avoid missing the receiving of MCCH control signaling, base station 1 need to use MP (Modification Period) and RP (Repetition Period) period transmission mechanism for MCCH control signaling. A MP is equal to one scheduling period; a MP period is equal to several RP periods. For example, a MP period includes 4 or 8 RPs. Ideally, base station 1 sends MCCH message in the first MBSFN subframe of every MP or RP beginning, and MCCH signaling will not be sent in other MBSFN subframes. Of course, because MBSFN subframe is discrete in a scheduling period, e.g. the subframe corresponding to the first period of MP beginning cannot perform MBSFN transmission, while MCCH control signaling is defined to be transmitted in MBSFN manner, therefore, this kind of situation may occur, RP starts from No. 40 subframe, MCCH may be sent in No. 39 or No. 41 subframe, wherein No. 39 and No. 41 subframes are MBSFN subframe. That is, MCCH control signaling is sent to mobile station in the MBSFN subframe closest to the MP and RP beginning only. Of course, how to define the closest MBSFN subframe, whether to choose the previous MBSFN subframe that is closest to MP/RP period beginning or the latter MBSFN subframe that is closest to MP/RP period beginning to transmit MCCH control signaling message, is predetermined by system, and every base station should have the same choosing method. The MCCH messages sent by base station 1 in each RP are the same, until MCCH message is updated, and the updated MCCH message appears in the closest MBSFN subframe to MP beginning, then the following RPs send periodically according to the updated MCCH message.

Base station 1 may extend system message to add the options for setting MP and RP, and send system message including MP and RP to mobile station 2 in advance.

Afterwards, in step S13, mobile station 2 receives the MBSFN subframe including MCCH control signaling from base station 1 on MP and RP scheduling period.

Afterwards, in step S14, mobile station 2 first reads PDDCH symbols of the MBSFN subframe, if DCI indication message is found, mobile station 2 decodes CRC for the DCI message. After CRC is decoded, mobile station 2 may get the corresponding RNTI value, for further determination whether decoding is needed for MCCH control signaling message. If decoding and demodulation is needed for MCCH control signaling, mobile station 2 decodes and demodulates the MCCH message according to MCCH MCS in PDCCH symbol. The following operations of mobile station 2 are poorly correlated to present invention, and therefore it won't be repeated here.

Those skilled in the art may understand, in this embodiment, step S10 and step S11 do not have apparent order, and the order in the context is only an implementation. Base station 1 may first generates MCCH related indication information, and then generates two TBs multiplexed on a MBSFN subframe according to MCCH control signaling and MTCH service data.

To simplify the above indication mechanism defined in PDCCH symbol, and make sure of the synchronization of the resources allocated to MCCH control signaling, rules may be defined as follows:

Before allocating resources to MTCH service data, allocate resources to MCCH first and at the beginning of PMCH RB.

Considering, only one MCCH TB and one MTCH TB can be transmitted in a MBSFN subframe simultaneously, and when the resources allocated to MCCH are determined, the rest resources will all be used for MTCH resource allocation, therefore, in PDCCH, indication of the resource allocation information of MCCH is needed instead of indication of the resource allocation information of MTCH.

If there is no MCCH transmitting in the current MBSFN subframe, resources will not be allocated to MCCH, and DCI of MCCH will not appear in PDCCH symbols.

The advantages of the first embodiment are:

Provide a more efficient and flexible transmission method for MCCH and MTCH;

Inherit the service scheduling indication in PDCCH of unicast, and therefore, maintain consistency with unicast.

But in order to implement the first embodiment, DCI which indicates the resource allocation of MCCH and MCS needs to be defined.

The Second Embodiment

Figure 3:
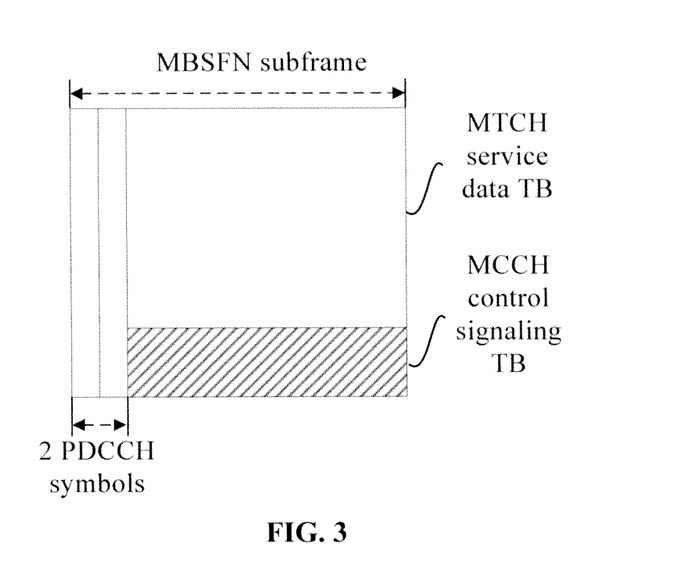
FIG. 3 shows a schematic diagram of the MBSFN subframe for transmitting MCCH control signaling according to the second embodiment of the present invention.
Figure 4:
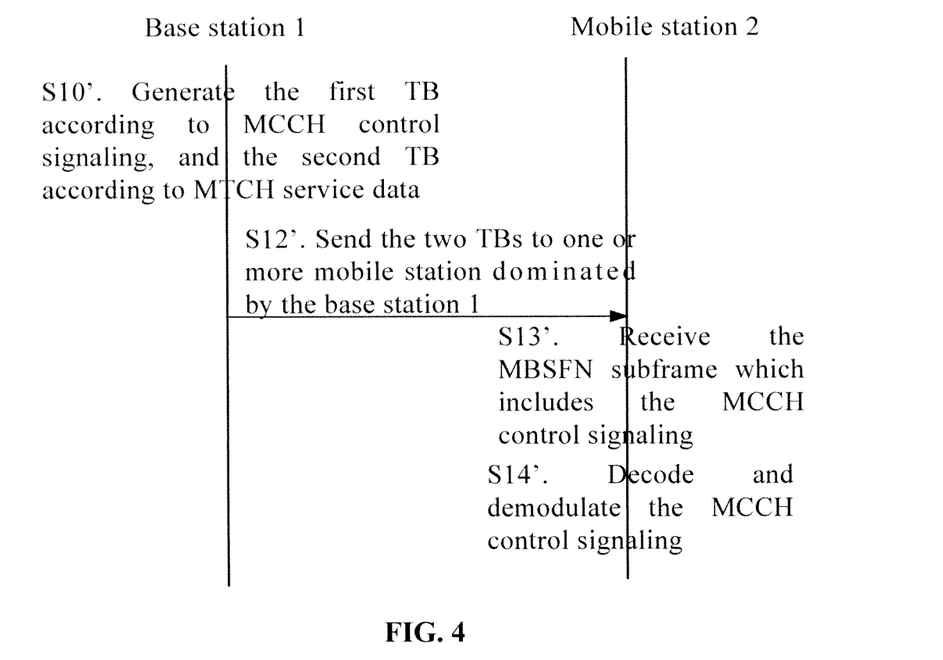
FIG. 4 shows a method flowchart according to the second embodiment of the present invention.

FIG. 3 shows a schematic diagram of the MBSFN subframe for transmitting MCCH control signaling according to the second embodiment of the present invention; FIG. 4 shows a method flowchart according to the second embodiment of the present invention.

Combining FIG. 4 and referring to FIG. 3, the method flowchart of the second embodiment of the present invention is described as follows. As shown in FIG. 4, in step S10', base station 1 generates the first TB according to MCCH control signaling, and the second TB according to MTCH service data. Therefore, as shown in FIG. 3, MCCH control signaling and MTCH service data are multiplexed to one subframe as two TB format. Wherein, resources allocated to MCCH control signaling are set to be fixed, reserved in the predetermined position, and the size is defined, e.g. the first symbol behind the two PDCCH symbols may be always reserved for MCCH control signaling transmission, then the rest 9 RBs in the MBSFN subframe may all be used for MTCH service data transmission.

Those skilled in the art may understand the first TB and the second TB shown in FIG. 3 as squares are for illustration only, the first TB may be mapped to one or more RBs which may be discrete, the second TB may be mapped to one or more RBs which may be discrete. Therefore, in fact, the pattern that RBs mapped to the MBSFN subframe may be irregular.

Afterwards, in step 12', base station 1 transmits the two TBs to physical layer via MCH, and sends to one or more mobile station dominated by the base station 1.

It should be noted that, MCCH control signaling is transmitted to the mobile station only in the MBSFN subframe which is closest to MP and RP beginning.

Afterwards, in step 13', mobile station 2 first receives the MBSFN subframe which includes MCCH control signaling from base station 1 in the MP and RP scheduling period.

Afterwards, in step 14', mobile station 2 decodes and demodulates the corresponding MCCH message according to e.g. MCS of MCCH captured in the system message. The following operations of mobile station 2 are poorly correlated in present invention, and therefore it will not be repeated here.

In a variant of the second embodiment, the method may further comprise S11' before step S12', in step S11', indication information to indicate the MCS of MCCH TB is added to two PDCCH symbols.

The advantages of the second embodiment are:
extra information to indicate the resource allocation of MCCH and MCS method are not needed;
make no change to the existing MBSFN subframe structure of PMCH.

But the second embodiment uses fixed reserving method for MCCH resource allocation, and does not take the different size of MCCH data in actual conditions into account. Therefore, compared to the resource utilization ratio in the first embodiment, the resource utilization ratio in the second illustration is lower.

The Third Embodiment

Figure 5:
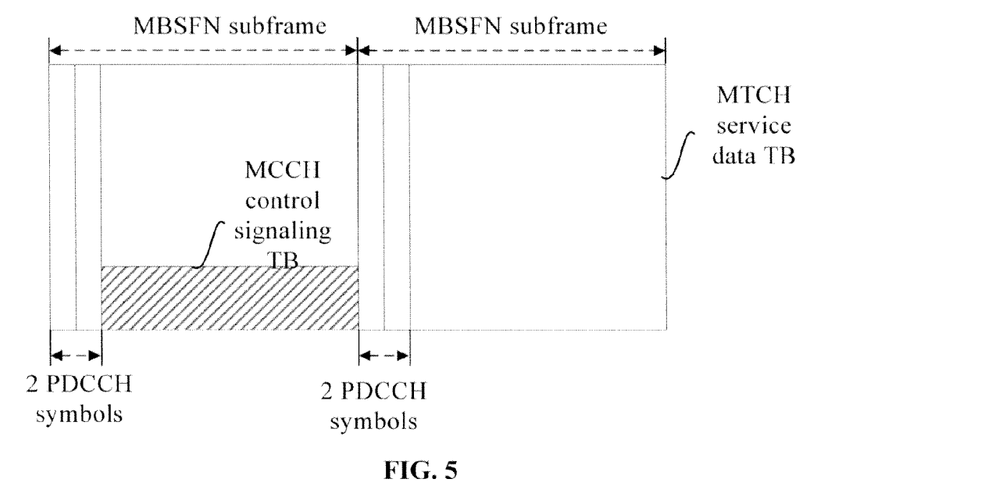
FIG. 5 shows a schematic diagram of the MBSFN subframe for transmitting MCCH control signaling according to the third embodiment of the present invention.
Figure 6:
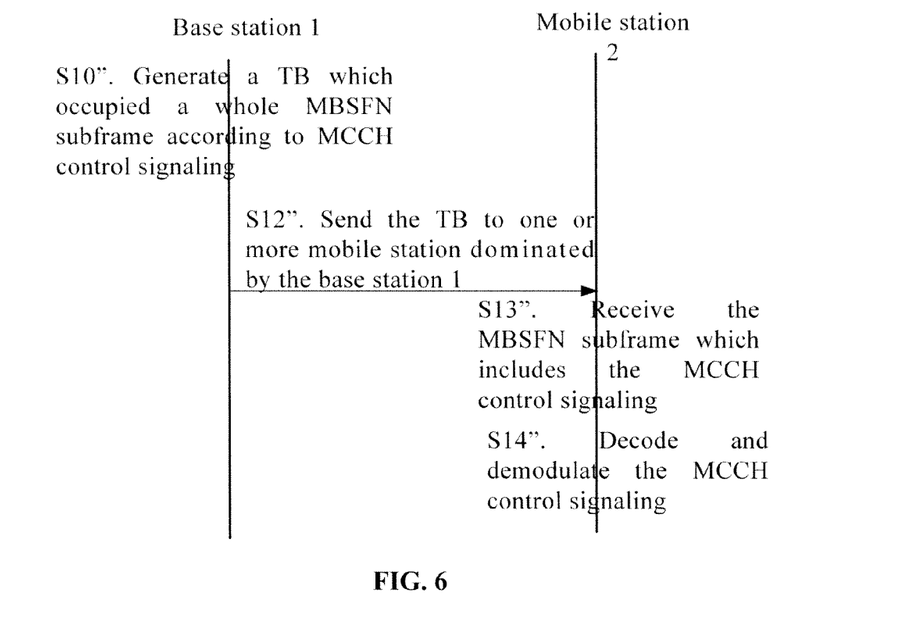
FIG. 6 shows a method flowchart according to the third embodiment of the present invention.

FIG. 5 shows a schematic diagram of the MBSFN subframe for transmitting MCCH control signaling in the third embodiment of the present invention; FIG. 6 shows a method flowchart of the third embodiment of the present invention.

Combining FIG. 6 and referring to FIG. 5, the method flowchart of the third embodiment of the present invention is described as follows. As shown in FIG. 6, in step S10", base station 1 packetizes MCCH control signaling exclusively into one MBSFN subframe. Therefore, as shown in FIG. 5, the MCCH control signaling TB occupies a MBSFN subframe, instead of multiplexing the MCCH control signaling and the MTCH service data, which means the MCCH control signaling and the MTCH service data cannot be transmitted in one MBSFN subframe simultaneously. Because the MCCH control signaling occupies one MBSFN subframe exclusively, and normally, resource allocation begins from the foremost of the resources after PDCCH symbol, and the MCCH control signaling is sent to the mobile station in the closest MBSFN subframe to the MP and RP period beginning, therefore, in the third embodiment, the indication information to indicate MCCH resource allocation is not needed.

Afterwards, in step S12", base station 1 transmits the TB to physical layer via MCH, and sends to one or more mobile station dominated by the base station 1.

It should be noted that, MCCH control signaling is transmitted only in the MBSFN subframe which is closest to MP and RP beginning.

Afterwards, in step S13", mobile station 2 first receives the MBSFN subframe which includes MCCH control signaling from base station 1 in the MP and RP scheduling period.

Afterwards, in step 14", mobile station 2 decodes and demodulates the corresponding MCCH message according to e.g. MCS of MCCH captured in the system message. The following operations of mobile station 2 are poorly correlated in present invention, and therefore it will not be repeated here.

Those skilled in the art can understand the TB shown in FIG. 5 as a square is for illustration only, the TB may be mapped to one or more RBs which may be discrete. Therefore, in fact, the pattern that RBs mapped in the MBSFN subframe may be irregular.

In a variant of the third embodiment, the method may comprise S11" before step S12", in step indication information to indicate the MCS of MCCH TB is added to two PDCCH symbols by base station 1.

The advantages of the third illustration are:
extra information to indicate the resource allocation of MCCH and MCS method are not needed;
But usually the data size of MCCH control signaling is small, the MCCH control signaling occupies one subframe in the third embodiment instead of being multiplexed with the MTCH service data, therefore the resource utilization ratio in the third embodiment is low.

The Fourth Embodiment

Figure 7:
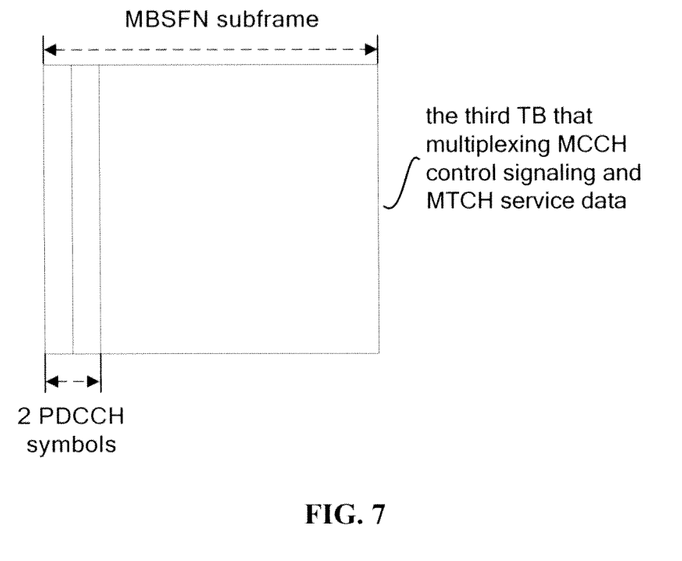
FIG. 7 shows a schematic diagram of the MBSFN subframe for transmitting MCCH control signaling according to the fourth embodiment of the present invention.
Figure 8:
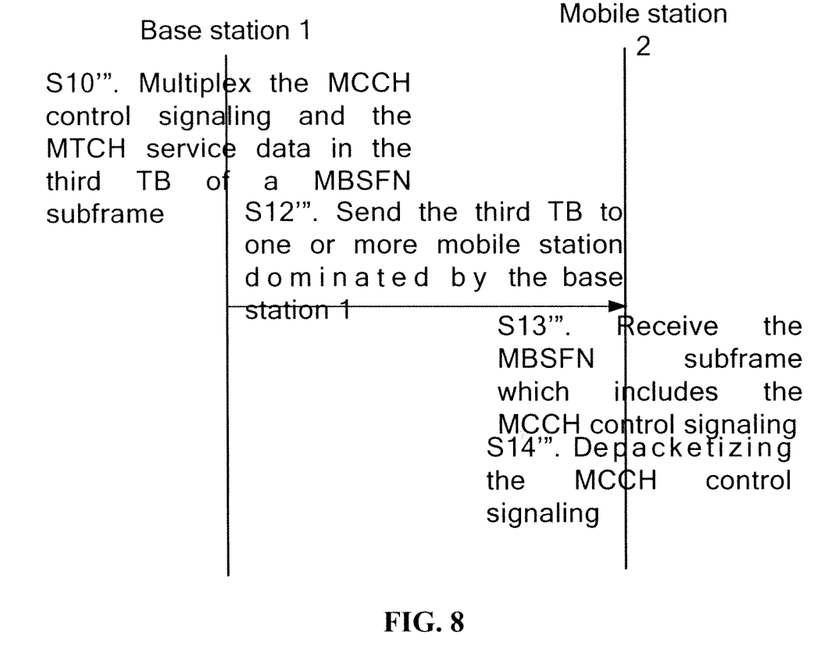
FIG. 8 shows a method flowchart according to the fourth embodiment of the present invention.

FIG. 7 shows a schematic diagram of the MBSFN subframe for transmitting MCCH control signaling in the fourth embodiment of the present invention; FIG. 8 shows a method flowchart of the fourth embodiment of the present invention.

Figure 9:
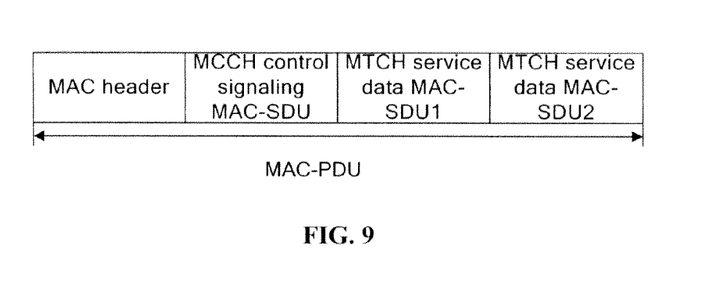
FIG. 9 shows a schematic diagram of a MAC-PDU according to the fourth embodiment of the present invention.

Combining FIG. 8 and referring to FIG. 7, the method flowchart of the third embodiment of the present invention is described as follows. As shown in FIG. 8, in step S10''', MCCH control signaling and MTCH service data are multiplexed in the third TB of one MBSFN subframe. Those skilled in the art can understand a TB corresponds to the protocol data unit of a MAC (Medium Access Control) that is MAC-PDU. As shown in FIG. 9, in a MAC-PDU, because MCCH and MTCH are in different logical channel, therefore, MCCH control signaling and MTCH service data are packetizes into different SDUs (Service Data Unit). Different SDU has different logical channel number and length. And there is information about each SDU length and corresponding logical channel number in MAC header, therefore, in the fourth embodiment, indication message to indicate the MCCH control signaling resource allocation is not needed, instead, the logical channel number in the MAC header may be used to find the MCCH directly.

Those skilled in the art can understand a MAC-PDU corresponds to a modulation and coding method. In the fourth embodiment, multiplexing the MCCH control signaling and the MTCH service data in one MAC-PDU, means they use the same modulation and coding method. But generally, because control signaling and service data require different QoS, control signaling and service data should be separated. In the fourth embodiment, multiplexing MCCH control signaling and MTCH service data in one TB, because MCCH control signaling is more important than MTCH service data, therefore, priority should be given to first satisfying the QoS required by MCCH control signaling. That means the MCS of multiplexed MCCH control signaling and MTCH service data that satisfies MCCH shall prevail. E.g. when QoS of MCCH control signaling is higher than that of MTCH service data, choosing the corresponding MCS according to the QoS of MCCH control signaling, to satisfy the QoS required by MCCH control signaling. Of course, if the QoS of MCCH control signaling is lower than that of MTCH service data, the MCS may be chosen according to the QoS of MCCH service data.

Afterwards, in step S12''', base station 1 transmits the third TB to physical layer via MCH, and sends to one or more mobile station dominated by the base station 1.

It should be noted that, MCCH control signaling is transmitted to the mobile station 2 only in the MBSFN subframe which is closest to MP and RP beginning.

Afterwards, in step S13''', mobile station 2 first receives the MBSFN subframe which includes MCCH control signaling from base station 1 in the MP and RP scheduling period.

Afterwards, in step 14''', mobile station 2 decodes MAC-PDU, finds the MAC-SDU corresponding to the MCCH control signaling according to the SDU length indicator and corresponding logical number of SDU in MAC header, and de-packetizes the MAC-SDU that packetizing the MCCH control signaling. The following operations are poorly correlated in present invention, and therefore it will not be repeated here.

The advantages of the fourth illustration are:
extra information to indicate the resource allocation of MCCH and MCS method are not needed;
But multiplex MCCH control signaling and MTCH service data in one TB has to use a same modulation and coding scheme, but the QoS of MCCH control signaling and the QoS of MTCH service data may be different.

The embodiments above all describe the situation of MCCH and MTCH mapped to MCH channel. In a variant example, MCCH may be mapped to DL-SCH (Downlink-Shared Channel), the first embodiment as an example, is described briefly in follows.

E.g. in the variant of the first embodiment, referring to FIG. 1, MCCH control signaling TB in MBSFN subframe may be mapped to DL-SCH, and MTCH service data TB is still mapped to MCH, therefore MBMS service data can be transmitted in MBSFN manner.

The above illustrations describe the present invention in method and process perspective; the following will describe the apparatus for MCCH control signaling transmitting in MBSFN manner in apparatus perspective.

The Fifth Embodiment

Figure 10:
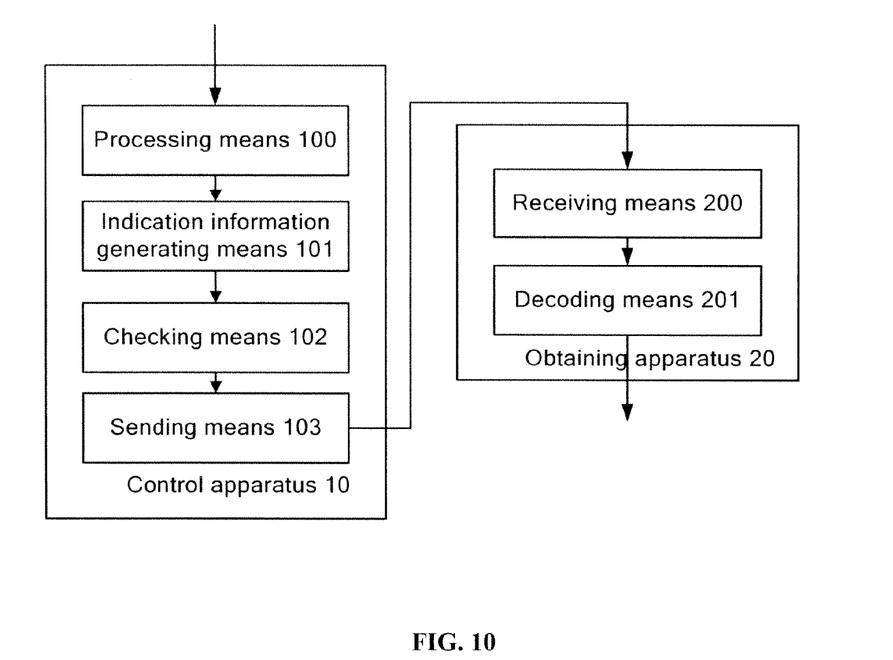
FIG. 10 shows an apparatus block diagram according to an embodiment of the present invention.

FIG. 10 shows an apparatus block diagram of an embodiment of the present invention. Referring to FIG. 10, and combining FIG. 1 and FIG. 2, the apparatus block diagram of the present invention is described as follows. Wherein, the control apparatus 10 shown in FIG. 10 is located in base station 1 shown in FIG. 2. Control apparatus 10 comprises processing means 100, indication message generating means 101, checking means 102, and sending means 103.

Obtaining apparatus 20 is located in mobile station shown in FIG. 2. Wherein, obtaining apparatus 20 comprises receiving means 200 and decoding means 201.

A MBSFN subframe is 1 ms, that is a TTI (Transmission Time Interval). A subframe includes 12 symbols, e.g. 12 OFDM symbols.

Wherein, the first two symbols in a MBSFN subframe are reserved to PHICH (Physical HARQ Indication Channel), CRS (Common Reference Signal) and etc., instead of MBSFN transmission, for unicast user to handover between cells, load balance or interference coordination measurement, therefore the first two symbols in MBSFN subframe can be considered as PDCCH (Physical Downlink Control Channel) symbols.

As shown in FIG. 10, processing means 100 generates the first TB according to MCCH control signaling which is MCCH control signaling TB, and the second TB according to MTCH service data which is MTCH service data TB. Therefore, as shown in FIG. 1, MCCH control signaling and MTCH service data are multiplexed in one subframe in the form of two TBs. Those skilled in the art can understand the first TB and the second TB show in FIG. 1 as squares are for illustration only, the first TB may be mapped to one or more RBs (Resource Block) which may be discrete, the second TB may be mapped to one or more RBs which may be discrete. Therefore, in fact, the pattern that RBs mapped on the MBSFN subframe may be irregular.

Afterwards, indication generating means 101 generates MCCH related indication information in the subframe. The MCCH related indication information comprises, e.g. DCI and MBMS-RNTI. The DCI and the MBMS-RNTI information can be located in PDCCH symbol.

Wherein defining DCI format 4, DCI format 4 comprises:
Information about the RBs occupied by MCCH, that is the location of MCCH signaling;
MCS (Modulation and Coding Schema) of MCCH.
In another embodiment, DCI format 4 can include new service notification indicator.

New defined DCI format 4 takes dynamic scheduling the necessary indication information of MCCH control signaling into consideration, therefore omits some parameter defined in other DCI format. Of course, already defined DCI format 1, 2 and etc. can be reused as well.

It should be noted that, indication information generating means 101 may determine the RBs occupied by MCCH precisely according to the actual amount of MCCH data, to achieve the dynamically scheduling of MCCH TB; and indication information generating means 101 may determine the MCS of MCCH dynamically according to the QoS required by MCCH.

MCCH related indication information includes MBMS-RNTI. For more reliable transmission, CRC (Cyclic Redundancy Check) may be used for DCI. When checking means 102 calculates CRC for DCI, RNTI is added to CRC as a mask. RNTI includes paging-RNTI, MBMS-RNTI, S-RNTI, User specific RNTI and etc., each RNTI has a fixed value defined in related protocols, which is not to repeat here. Base station 1 knows what data is needed for scheduling, therefore it will add corresponding RNTI in CRC according to the data actually for scheduling.

Afterwards, sending means 103 transmits the two TBs to physical layer via MCH, and send to one or more mobile station dominated by the base station 1.

Considering the reliability of transmission, power saving mode of UE, and avoid missing the receiving of MCCH control signaling, sending means 103 need to use MP (Modification Period) and RP (Repetition Period) period transmission mechanism for MCCH control signaling. A MP is equal to one scheduling period; a MP period is equal to several RP periods. For example, a MP period includes 4 or 8 RPs. Ideally, sending means 103 sends MCCH message in the first MBSFN subframe of every MP or RP beginning, and MCCH signaling will not be sent in other MBSFN subframe. Of course, because MBSFN subframe is discrete in a scheduling period, e.g. the subframe corresponding to the first period of MP beginning cannot perform MBSFN transmission, while MCCH control signaling is set to be transmitted in MBSFN manner, therefore, this kind of situation may occur, RP starts from No. 40 subframe, MCCH may be sent in No. 39 or No. 41 subframe, wherein No. 39 and No. 41 subframes are MBSFN subframe. That is, MCCH control signaling is sent to mobile station in the MBSFN subframe closest to the MP and RP beginning only. Of course, it is predetermined by system how to define the closest MBSFN subframe, whether to choose the previous MBSFN subframe to the closest to MP/RP period beginning or the latter MBSFN subframe to the closest to MP/RP period beginning to transmit MCCH control signaling message, and every base station should have the same choosing method. The MCCH messages sent by sending means 103 in each RP are the same, until MCCH message is updated, and updated MCCH message appears in the closest MBSFN subframe to MP beginning, then the following RPs send periodically according to the updated MCCH message.

Base station 1 may extend system message, to add the options for setting MP and RP, and send system message including MP and RP to mobile station 2 in advance.

Afterwards, receiving means 200 in obtaining apparatus 20, first receives the MBSFN subframe including MCCH control signaling from base station 1 on MP and RP scheduling period.

Afterwards, decoding means 201 first reads PDDCH symbol of the MBSFN subframe first, if DCI indication message is found, mobile station 2 decode CRC for the DCI message. After CRC decoding, decoding means 201 may get the corresponding RNTI value, for further determine whether decoding is needed for MCCH control signaling message. If decoding and demodulation is needed for MCCH control signaling, decoding means 201 decodes and demodulates the MCCH message according to MCCH MCS in PDCCH symbol. The following operations of Mobile station 2 are poorly correlated to present invention, and therefore it won't be repeated here.

Those skilled in the art may understand, in this embodiment, the operations of processing means 100 and indication generating means 101 do not have apparent order, and the order in the context is only an implementation. Indication generation means can first generates MCCH related indication information, and then processing means 100 generates the two TBs multiplexed on a MBSFN subframe according to MCCH control signaling and MTCH service data.

To simplify the above indication mechanism defined in PDCCH symbol, and make sure of the synchronization of the resources allocated to MCCH control signaling, rules may be defined as follows:

Before allocating resources to MTCH service data, allocate resources to MCCH first and at the beginning of PMCH RB.
Considering, only one MCCH TB and one MTCH TB can be transmitted in a MBSFN subframe simultaneously, and when the resources allocated to MCCH are determined, the rest resources will all be used for MTCH resource allocation, therefore, in PDCCH, indication of the resource allocation information of MCCH is needed instead of indication of the resource allocation information of MTCH.

But in order to achieve the first embodiment, DCI which indicate the resource allocation of MCCH and MCS needs to be defined.

The Sixth Embodiment

Figure 11:
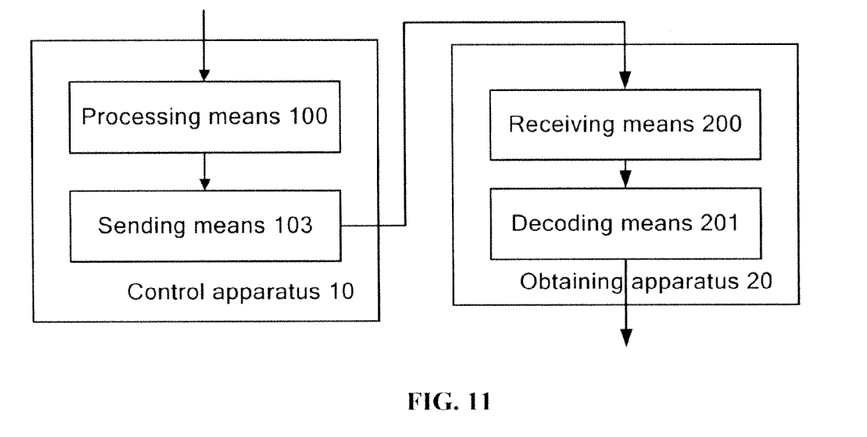
FIG. 11 shows an apparatus block diagram according to another embodiment of the present invention.

FIG. 11 shows an apparatus block diagram of another embodiment of the present invention. Referring to FIG. 11, and combining FIG. 3 and FIG. 4, the apparatus block diagram of the present invention is described as follows. Wherein, the control apparatus 10 shown in FIG. 1 is located in base station 1 shown in FIG. 4. Control apparatus 10 comprises processing means 100 and sending means 103.

Obtaining apparatus 20 is located in mobile station shown in FIG. 4. Wherein, obtaining apparatus 20 comprises receiving means 200 and decoding means 201.

Now referring to FIG. 11, and combining FIG. 3 and FIG. 4, the apparatus block diagram of the present invention is described as follows. As shown in FIG. 11, processing means 100 generates the first TB according to MCCH control signaling, and the second TB according to MTCH service data. Therefore, as shown in FIG. 3, MCCH control signaling and MTCH service data are multiplexed to one subframe in the form of two TBs. Wherein, processing means 100 is set to allocate fixed resources, which is reserved in the predetermined position with the defined size, to MCCH control signaling, e.g. processing means 100 may set the first symbol behind the two PDCCH symbols as reserved for MCCH control signaling transmission, then the rest 9 RBs in the MBSFN subframe may all be used for MTCH service data transmission.

Those skilled in the art may understand the first TB and the second TB shown in FIG. 3 as squares are illustration only, the first TB may be mapped to one or more RBs which may be discrete, the second TB can be mapped to one or more RBs which may be discrete. Therefore, in fact, the pattern that RBs mapped in the MBSFN subframe may be irregular.

Afterwards, sending means 103 transmits the two TBs to physical layer via MCH, and sends to one or more mobile station dominated by the base station 1.

It should be noted that, MCCH control signaling is transmitted to the mobile station only in the MBSFN subframe which is closest to MP and RP beginning.

Afterwards, receiving means 200 first receives the MBSFN subframe which includes MCCH control signaling from base station 1 in the MP and RP scheduling period.

Afterwards, receiving means 200 decodes and demodulates the corresponding MCCH message according to e.g. MCS of MCCH captured in the system message. The following operations of Mobile station 2 are poorly correlated in present invention, and therefore it won't be repeated here.

In a variant of the sixth embodiment, controlling apparatus 10 comprises indication generating means 101 (not shown in FIG. 11), which is used to add indication information to indicate the MCS of MCCH TB to two PDCCH symbols.

The advantages of the sixth embodiment are:
extra information to indicate the resource allocation of MCCH and MCS method are not needed;
make no change to the existing MBSFN subframe structure of PMCH.

But the sixth embodiment uses fixed reserving method for MCCH resource allocation, and does not take the different size of MCCH data in actual conditions into account. Therefore, compare to the resource utilization ratio in the first embodiment, the resource utilization ratio in the second illustration is lower.

The Seventh Embodiment

Figure 12:
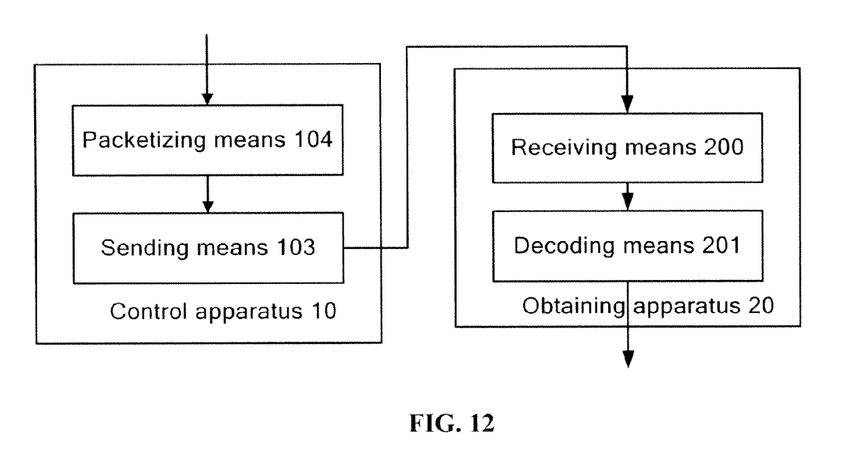
FIG. 12 shows an apparatus block diagram according to yet another embodiment of the present invention.

FIG. 12 shows an apparatus block diagram of yet another embodiment of the present invention. Referring to FIG. 12, and combining FIG. 5 and FIG. 6, the apparatus block diagram of the present invention is described as follows. Wherein, the control apparatus 10 shown in FIG. 12 is located in base station 1 shown in FIG. 6. Control apparatus 10 comprises packetizing means 104 and sending means 103.

Obtaining apparatus 20 is located in mobile station shown in FIG. 6. Wherein, obtaining apparatus 20 comprises receiving means 200 and decoding means 201.

Now referring to FIG. 12, and combining FIG. 5 and FIG. 6, the apparatus block diagram of the sixth embodiment of the present invention is described as follows. As shown in FIG. 12, packetizing means 104 packetizes MCCH control signaling exclusively into one MBSFN subframe. Therefore, as shown in FIG. 5, the MCCH control signaling TB occupies a MBSFN subframe, instead of multiplexing the MCCH control signaling and the MTCH service data, which means the MCCH control signaling and the MTCH service data cannot be transmitted in one MBSFN subframe simultaneously. Because the MCCH control signaling occupies one MBSFN subframe exclusively, but normally, resource allocation begins from the foremost of the resources after PDCCH symbol, and the MCCH control signaling is sent to the mobile station in the closest MBSFN subframe to the MP and RP period beginning, therefore, in the third embodiment, the indication information to indicate MCCH resource allocation is not needed.

Afterwards, sending means 103 transmits the TB generated by packetizing means 104 to physical layer via MCH, and send to one or more mobile station under the base station 1.

It should be noted that, MCCH control signaling is transmitted only in the MBSFN subframe which is closest to MP and RP beginning.

Afterwards, receiving means 200 first receives the MBSFN subframe which includes MCCH control signaling from base station 1 in the MP and RP scheduling period.

Besides, decoding means 201 decodes and demodulates the corresponding MCCH message according to e.g. MCS of MCCH captured in the system message. The following operations of mobile station 2 are poorly correlated in present invention, and therefore it will not be repeated here.

Those skilled in the art can understand the TB shown in FIG. 5 as a square is illustration only, the TB may be mapped to one or more RBs which may be discrete. Therefore, in fact, RBs mapped in the MBSFN subframe may be irregular.

In a variant of the seventh embodiment, controlling apparatus 10 may comprises indication means 101 (not shown in FIG. 12) which is used to add indication information that indicating the MCS of MCCH TB to two PDCCH symbols by base station 1.

The advantages of the seventh illustration are:
extra information to indicate the resource allocation of MCCH and MCS method are not needed;
But usually the data size of MCCH control signaling is small, the MCCH control signaling occupies one subframe in the seventh embodiment instead of being multiplexed with the MTCH service data, therefore the resource utilization ratio in the third embodiment is low.

The Eighth Embodiment

Figure 13:
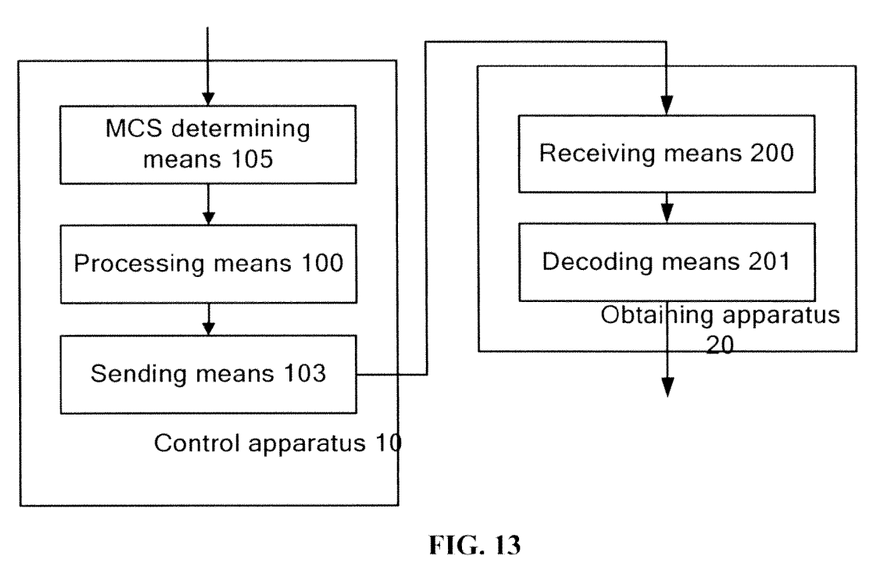
FIG. 13 shows an apparatus block diagram according to yet another embodiment of the present invention.

FIG. 13 shows an apparatus block diagram of yet another embodiment of the present invention. Referring to FIG. 13, and combining FIG. 7 and FIG. 8, the apparatus block diagram of the present invention is described as follows. Wherein, the control apparatus 10 shown in FIG. 13 is located in base station 1 shown in FIG. 8. Control apparatus 10 comprises processing means 100, modulation and coding means 105 and sending means 103.

Obtaining apparatus 20 is located in mobile station shown in FIG. 8. Wherein, obtaining apparatus 20 comprises receiving means 200 and decoding means 201.

Combining FIG. 13 and referring to FIG. 7 and FIG. 8, the method flowchart of the eighth embodiment of the present invention is described as follows. As shown in FIG. 13, control apparatus 10 multiplexes MCCH control signaling and MTCH service data in the third TB of one MBSFN subframe. Those skilled in the art can understand a TB corresponds to the protocol data unit of a MAC (Medium Access Control) that is MAC-PDU. As shown in FIG. 9, in a MAC-PDU, because MCCH and MTCH are in different logical channel, therefore, MCCH control signaling and MTCH service data are packetizes into different SDUs (Service Data Unit). Different SDU has different logical channel number and length. And there is information about each SDU length and corresponding logical channel number in MAC header, therefore, in the fourth embodiment, indication message to indicate the MCCH control signaling resource allocation is not needed, instead the logical channel number in the MAC header may be used to find the MCCH directly.

Those skilled in the art can understand a MAC-PDU corresponds to a modulation and coding method. In the fourth embodiment, multiplexing the MCCH control signaling and the MTCH service data in one MAC-PDU, means they use the same modulation and coding method. But generally, because control signaling and service data require different QoS, control signaling and service data should be divided. In the eighth embodiment, multiplexing MCCH control signaling and MTCH service data in one TB, because MCCH control signaling is more important than MTCH service data, therefore, preferably satisfying the QoS required by MCCH control signaling. That means the MCS of multiplexed MCCH control signaling and MTCH service data that satisfies MCCH shall prevail. E.g. when QoS of MCCH control signaling is higher than that of MTCH service data, choosing the corresponding MCS according to the QoS of MCCH control signaling, to satisfy the QoS required by MCCH control signaling. Of course, if the QoS of MCCH control signaling is lower than that of MTCH service data, the MCS may be chosen according to the QoS of MCCH service data.

Afterwards, sending means 103 transmits the third TB to physical layer via MCH, and sends to one or more mobile station dominated by the base station 1.

It should be noted that, MCCH control signaling is transmitted to the mobile station 2 only in the MBSFN subframe which is closest to MP and RP beginning.

Afterwards, receiving means 200 first receives the MBSFN subframe which includes MCCH control signaling from base station 1 in the MP and RP scheduling period.

Afterwards, decoding means 201 decodes MAC-PDU, finds the MAC-SDU corresponding to the MCCH control signaling according to the SDU length and SDU corresponding logical number in MAC header, and de-packetizes the MAC-SDU in which packetizing the MCCH control signaling. The following operations are poorly correlated in present invention, and therefore it will not be repeated here.

The advantages of the eighth illustration are:

extra information to indicate the resource allocation of MCCH and MCS method are not needed;

But multiplex MCCH control signaling and MTCH service data in one TB has to use a same modulation and coding scheme, but the QoS of MCCH control signaling and the QoS of MTCH service data may be different.

The embodiments above all describe the situation of MCCH and MTCH mapped to MCH channel. In a variant example, MCCH may be mapped to DL-SCH (Downlink-Shared Channel), the first illustration as an example, is described briefly in follows.

E.g. in the variant of the fifth illustration, referring to FIG. 1, MCCH control signaling TB in MBSFN subframe may be mapped to DL-SCH, and MTCH service data TB is still mapped to MCH, therefore MBMS service data may be transmitted in MBSFN manner.

Those skilled in the art can understand the apparatuses described in the embodiments above use functional module, the different means in the embodiments above may be implemented with the same hardware, e.g. processing means 100, indication information generating means 101 and checking means 102 may be integrated in one hardware for implementation, besides, the means in different embodiments implementing the same function may be implemented with the same hardware, e.g. processing means 100 in the fifth embodiment and packetizing means 104 in the seventh embodiment may be implemented in a hardware.

The above is the description of the embodiments of the present invention. However, the present invention is not limited to specific system, apparatus or specific protocol. Those skilled in the art may carry out various modification or variation in the scope of the appended claims.

The invention claimed is:

1. A method, in a base station in wireless telecommunication network, to control MCCH (Multicast Control Channel) control signaling transmission, wherein the method comprises:
   multiplexing MTCH (Multicast Traffic Channel) control signaling and MCCH (Multicast Control Channel) control signaling in one MBSFN (Multicast Broadcast Single Frequency Network) subframe comprising indication, information;
   transmitting MCCH (Multicast Control Channel) control signaling in a MBSFN (Multicast Broadcast Single Frequency Network) manner; and
   cyclic redundancy checking the indication information according to a wireless cell network temporary ID.

2. A method according to claim 1, wherein transmitting MCCH control signaling further comprises:
   transmitting MCCH (Multicast Control Channel) control signaling in the MBSFN (Multicast Broadcast Single Frequency Network) manner, according to at least one of a modification period and a repetition period.

3. A method according to claim 2, wherein the at least one of the modification period and the repetition period related information is sent via a system message.

4. A method according to claim 1, wherein the MCCH (Multicast Control Channel) control signaling is multiplexed in the same MBSFN (Multicast Broadcast Single Frequency Network) sub-frame with MTCH (Multicast Traffic Channel) control signaling.

5. A method according to claim 4, wherein multiplexing the MTCH control signaling further comprises:
   generating a first TB (Transmission Block) according to MCCH (Multicast Control Channel) control signaling, and a second TB (Transmission Block) according to MTCH (Multicast Traffic Channel) control signaling, wherein the first TB (Transmission Block) and the second TB (Transmission Block) are multiplexed in one MBSFN (Multicast Broadcast Single Frequency Network) subframe.

6. A method according to claim 5, wherein the indication information comprises the position and the modulation and coding scheme of the first TB (Transmission Block).

7. A method according to claim 6, wherein the indication information further includes notification of whether a new MBMS (Multimedia Broadcast Multicast Service) is generated or not.

8. A method according to claim 5, wherein the method further comprises allocating fixed time frequency resources in the MBSFN (Multicast Broadcast Single Frequency Network) to the first TB (Transmission Block).

9. A method according to claim 4, wherein multiplexing the MTCH control signaling further comprises:
   generating a third TB (Transmission Block) according to MCCH (Multicast Control Channel) control signaling and MTCH (Multicast Traffic Channel) control signaling.

10. A method according to claim 9, wherein the method further comprises determining the modulation and coding scheme of the third TB (Transmission Block), according to the QoS of MCCH (Multicast Control Channel) control signaling.

11. A method according to claim 1, wherein transmitting MCCH control signaling further comprises:
   packetizing MCCH (Multicast Control Channel) control signaling exclusively into one MBSFN (Multicast Broadcast Single Frequency Network) subframe;
   transmitting MCCH control signaling further comprises:
   transmitting the MCCH (Multicast Control Channel) control signaling which is packetizing exclusively into the MBSFN (Multicast Broadcast Single Frequency Network) subframe.

12. A control apparatus, in a base station in wireless telecommunication network, to control MCCH (Multicast Control Channel) control signaling transmission, wherein:
   the control apparatus is configured to:
      multiplex MTCH (Multicast Traffic Channel) control signaling and MCCH (Multicast Control Channel) control signaling in one MBSFN (Multicast Broadcast Single Frequency Network) subframe comprising indication information; and
   perform a cyclic redundancy check on the indication information according to a wireless cell network temporary ID;
   wherein the control apparatus further comprises a transmitter that transmits MCCH (Multicast Control Channel) control signaling in a MBSFN (Multicast Broadcast Single Frequency Network) manner.

* * * * *